(12) United States Patent
Liu et al.

(10) Patent No.: US 10,436,568 B2
(45) Date of Patent: Oct. 8, 2019

(54) WHEEL BLANK INSPECTION DEVICE

(71) Applicant: CITIC Dicastal CO., LTD., Qinhuangdao, Hebei (CN)

(72) Inventors: Huiying Liu, Qinhuangdao (CN); Zhen Li, Qinhuangdao (CN); Dan Yao, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 234 days.

(21) Appl. No.: 15/797,455

(22) Filed: Oct. 30, 2017

(65) Prior Publication Data

US 2019/0063896 A1  Feb. 28, 2019

(30) Foreign Application Priority Data

Aug. 28, 2017  (CN) .......................... 2017 1 0751996

(51) Int. Cl.
*G01B 5/20*  (2006.01)
*G01B 7/16*  (2006.01)
*G01M 17/013*  (2006.01)

(52) U.S. Cl.
CPC ............. *G01B 7/16* (2013.01); *G01M 17/013* (2013.01)

(58) Field of Classification Search
CPC .................................................. G01B 5/0025
USPC ............................................. 33/203, 203.12
See application file for complete search history.

(56) References Cited

U.S. PATENT DOCUMENTS

| | | | | |
|---|---|---|---|---|
| 3,990,666 A | * | 11/1976 | Morrison | G01B 5/0025 248/205.1 |
| 6,810,593 B2 | * | 11/2004 | Kobayashi | F16F 15/324 33/203 |
| 2008/0123107 A1 | * | 5/2008 | Sotgiu | B60C 25/0554 356/601 |
| 2018/0259325 A1 | * | 9/2018 | Su | G01B 11/2518 |
| 2019/0193241 A1 | * | 6/2019 | Liu | B24B 47/12 |
| 2019/0195611 A1 | * | 6/2019 | Liu | G01B 5/0025 |
| 2019/0224792 A1 | * | 7/2019 | Liu | B23Q 3/062 |
| 2019/0224800 A1 | * | 7/2019 | Liu | B23Q 16/04 |
| 2019/0224802 A1 | * | 7/2019 | Liu | B24B 5/44 |

FOREIGN PATENT DOCUMENTS

| | | |
|---|---|---|
| CN | 202382715 U | 8/2012 |
| CN | 103234474 A | 8/2013 |
| CN | 103557811 A | 8/2014 |
| CN | 204924223 U | 12/2015 |
| CN | 106840069 A | 6/2017 |
| CN | 207050660 U | 2/2018 |

* cited by examiner

*Primary Examiner* — George B Bennett
*Assistant Examiner* — G Bradley Bennett
(74) *Attorney, Agent, or Firm* — Cooper Legal Group, LLC

(57) ABSTRACT

A wheel blank inspection device is composed of a rack, a lower adjusting guide rail, a lower adjusting cylinder, a first left sliding table, a first gear rack, a first right sliding table and the like. A wheel rotates a circle at a low speed, when a first piezoelectric sensor, a second piezoelectric sensor and a third piezoelectric sensor do not pick up signals and probes of a first intelligent meter, a second intelligent meter and a third intelligent meter are in a compressed state all the time, the wheel blank is qualified, otherwise, the wheel blank is deformed greatly and unqualified. After inspection, the qualified blank enters a normal lower transfer roller bed, and the unqualified blank enters a reject roller bed.

1 Claim, 4 Drawing Sheets

WHEEL BLANK INSPECTION DEVICE

CROSS-REFERENCE TO RELATED APPLICATIONS

The present application claims benefit of Chinese Patent Application No. 201710751996.3, filed on Aug. 28, 2017, the contents of which are hereby incorporated by reference in its entirety.

BACKGROUND

Casting deformation is always a control difficulty in the manufacturing process of aluminum alloy wheels. In actual production, after a wheel is cast and thermally treated, common deformation defects are that: the flange position is deformed up or down and misplaced, directly resulting in that the rim depth of the blank is unqualified; the end face of the blank machining positioning wheel lip is deformed, and the height of the wheel is out of tolerance, directly resulting in that the wheel cannot be accurately positioned during machining; and the rim is deformed in the circumferential direction, and is changed from circle to ellipse. When the blanks having these casting deformation defects are machined, the defects of machining failure and deviation occur, and qualified products cannot be obtained, causing waste of machining resources. Therefore, if the blanks having great casting deformation can be timely screened before machining to prevent them from entering the machining procedure, the production efficiency will be greatly improved, and the manufacturing resources will be saved.

SUMMARY

The disclosure relates to the technical field of inspection, specifically to a wheel blank inspection device.

The disclosure is aimed at providing a wheel blank inspection device, which can inspect a cast blank deformed greatly to prevent it from entering a machining procedure.

In order to achieve the above object, the technical solution of the disclosure is: a wheel blank inspection device is composed of a rack, a lower adjusting guide rail, a lower adjusting cylinder, a first left sliding table, a first gear rack, a first right sliding table, a first left support frame, a first servo electric cylinder, first left guide posts, a first left platform, a first flange inspection rod, a first piezoelectric sensor, a first right support frame, a second servo electric cylinder, first right guide posts, a first right platform, a second flange inspection rod, a first intelligent meter, guide rails, a left sliding plate, a right sliding plate, third gear racks, a clamping cylinder, a servo motor, a clamping wheel, a left guide rail, a left sliding block, a left electric cylinder, a first rim inspection rod, a second piezoelectric sensor, a right guide rail, a right sliding block, a right electric cylinder, a second rim inspection rod, a second intelligent meter, an upper adjusting guide rail, a second left sliding table, a second gear rack, a second right sliding table, an upper adjusting cylinder, a second left support frame, a third servo electric cylinder, second left guide posts, a second left platform, a first end face inspection rod, a third piezoelectric sensor, a second right support frame, a fourth servo electric cylinder, second right guide posts, a second right platform, a second end face inspection rod and a third intelligent meter.

The left sliding plate and the right sliding plate are symmetrically mounted on the guide rails and connected via the third gear racks, the clamping cylinder is fixed on the rack, and the output end of the clamping cylinder is connected with the left sliding plate. The servo motor is mounted on the left sliding plate, and the clamping wheel is mounted at the output end of the motor; when the clamping cylinder drives the left sliding plate to move, the right sliding plate moves synchronously under the structural action of the third gear racks, and a wheel can be positioned and clamped; and when the servo motor drives the clamping wheel to rotate, the wheel can rotate at a low speed under the action of friction.

The first left sliding table and the first right sliding table are symmetrically mounted on the lower adjusting guide rail and connected via the first gear rack, the lower adjusting cylinder is fixed on the rack, the output end of the lower adjusting cylinder is connected with the first left sliding table, the first left support frame is fixed on the first left sliding table, the first servo electric cylinder is mounted on the first left support frame, the output end of the first servo electric cylinder is connected with the first left platform, the first flange inspection rod is fixed on the first left platform, and the first piezoelectric sensor is mounted at the top of the first flange inspection rod. The first right support frame is fixed on the first right sliding table, the second servo electric cylinder is mounted on the first right support frame, the output end of the second servo electric cylinder is connected with the first right platform, the second flange inspection rod is fixed on the first right platform, and the first intelligent meter is mounted on the second flange inspection rod. The lower adjusting cylinder can adjust the distance between the first flange inspection rod and the second flange inspection rod, and is used for inspecting wheels having different flange diameters. During inspection, the first servo electric cylinder drives the first flange inspection rod to ascend to the lower allowance of the rim depth, after the wheel rotates a circle, if the first piezoelectric sensor does not pick up a signal, the rim depth of the wheel does not exceed the lower allowance, and if the first piezoelectric sensor picks up a signal, the rim depth of the wheel exceeds the lower allowance; and the second servo electric cylinder drives the second flange inspection rod to ascend to the upper allowance of the rim depth, after the wheel rotates a circle, if the probe of the first intelligent meter is compressed all the time, the rim depth does not exceed the upper allowance, and if the probe of the first intelligent meter cannot be compressed all the time, the rim depth exceeds the upper allowance.

The left sliding block is mounted on the left guide rail, the left electric cylinder is fixed on the left sliding block, the output end of the left electric cylinder is connected with the side rack, the first rim inspection rod is mounted at the right end of the left sliding block, and the second piezoelectric sensor is mounted at the top of the first rim inspection rod. The right sliding block is mounted on the right guide rail, the right electric cylinder is fixed on the right sliding block, the output end of the right electric cylinder is connected with the side rack, the second rim inspection rod is mounted at the left end of the right sliding block, and the second intelligent meter is mounted on the second rim inspection rod. During inspection, the left electric cylinder drives the first rim inspection rod to move right to the upper allowance of the rim diameter, after the wheel rotates a circle, if the second piezoelectric sensor does not pick up a signal, the rim diameter of the wheel does not exceed the upper allowance, and if the second piezoelectric sensor picks up a signal, the rim diameter exceeds the upper allowance; and the right electric cylinder drives the second rim inspection rod to move left to the lower allowance of the rim diameter, after the wheel rotates a circle, if the probe of the second intelligent meter is compressed all the time, the rim diameter does not exceed the lower allowance, and if the probe of the second intelligent meter cannot be compressed all the time, the rim diameter exceeds the lower allowance.

The second left sliding table and the second right sliding table are symmetrically mounted on the upper adjusting guide rail and connected via the second gear rack, the upper adjusting cylinder is fixed on the rack, the output end of the upper adjusting cylinder is connected with the second left sliding table, the second left support frame is fixed on the second left sliding table, the third servo electric cylinder is mounted on the second left support frame, the output end of the third servo electric cylinder is connected with the second left platform, the first end face inspection rod is fixed on the second left platform, and the third piezoelectric sensor is mounted at the top of the first end face inspection rod. The second right support frame is fixed on the second right sliding table, the fourth servo electric cylinder is mounted on the second right support frame, the output end of the fourth servo electric cylinder is connected with the second right platform, the second end face inspection rod is fixed on the second right platform, and the third intelligent meter is mounted on the second end face inspection rod. When the upper adjusting cylinder is started, it can adjust the distance between the first end face inspection rod and the second end face inspection rod, and is used for inspecting the end faces of wheels having different outer diameters. During inspection, the third servo electric cylinder drives the first end face inspection rod to descend to the upper allowance of the wheel height, after the wheel rotates one circle, if the third piezoelectric sensor does not pick up a signal, the wheel height does not exceed the upper allowance, and if the third piezoelectric sensor picks up a signal, the wheel height exceeds the upper allowance; and the fourth servo electric cylinder drives the second end face inspection rod to descend to the lower allowance of the wheel height, after the wheel rotates one circle, if the probe of the third intelligent meter is compressed all the time, the wheel height does not exceed the lower allowance, and if the probe of the third intelligent meter cannot be compressed all the time, the wheel height exceeds the lower allowance.

The working process of the wheel blank inspection device is: first, the distance between the first flange inspection rod and the second flange inspection rod is adjusted according to the flange diameter of a wheel produced on line, and the distance between the first end face inspection rod and the second end face inspection rod is adjusted according to the outer diameter of the wheel produced on line. After the wheel enters the device, the clamping cylinder is started first to position and clamp the wheel; then the first servo electric cylinder, the second servo electric cylinder, the third servo electric cylinder, the fourth servo electric cylinder, the left electric cylinder and the right electric cylinder are started synchronously, the first servo electric cylinder drives the first flange inspection rod to ascend to the lower allowance of the rim depth, the second servo electric cylinder drives the second flange inspection rod to ascend to the upper allowance of the rim depth, the left electric cylinder drives the first rim inspection rod to move right to the upper allowance of the rim diameter, the right electric cylinder drives the second rim inspection rod to move left to the lower allowance of the rim diameter, the third servo electric cylinder drives the first end face inspection rod to descend to the upper allowance of the wheel height, and the fourth servo electric cylinder drives the second end face inspection rod to descend to the lower allowance of the wheel height; next, the servo motor is started to drive the wheel to rotate a circle at a low speed, when the first piezoelectric sensor, the second piezoelectric sensor and the third piezoelectric sensor do not pick up signals and the probes of the first intelligent meter, the second intelligent meter and the third intelligent meter are in a compressed state all the time, the wheel blank is qualified, otherwise, the wheel blank is deformed greatly and unqualified. After inspection, the qualified blank enters a normal lower transfer roller bed, and the unqualified blank enters a reject roller bed.

The disclosure can inspect a cast blank deformed greatly to prevent it from entering a machining procedure, and the device is advanced in process, efficient, practical and easy to manufacture and can be used for 100% detection of cast blanks in automatic continuous production.

Figure 1:
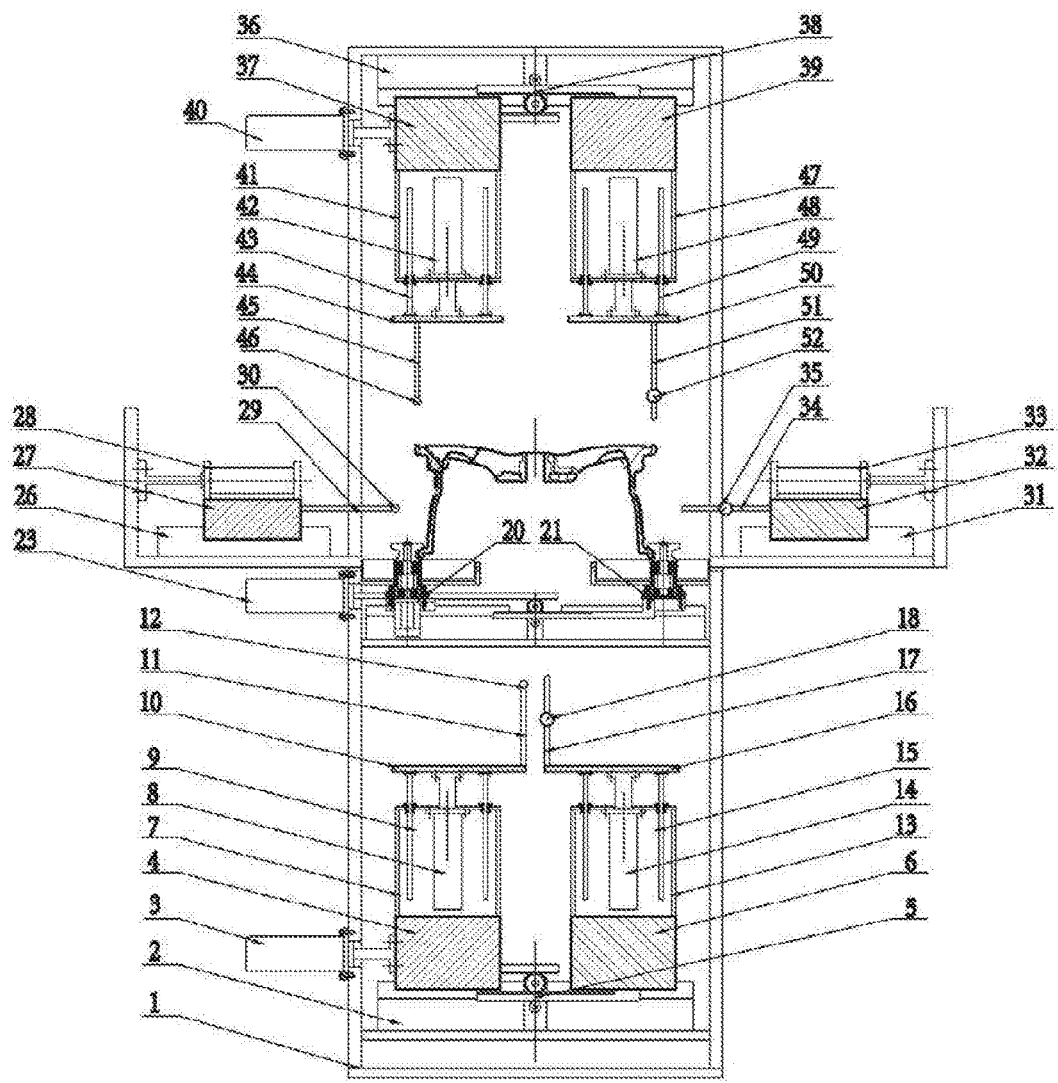
FIG. 1 is a front view of a wheel blank inspection device of the disclosure.
Figure 2:
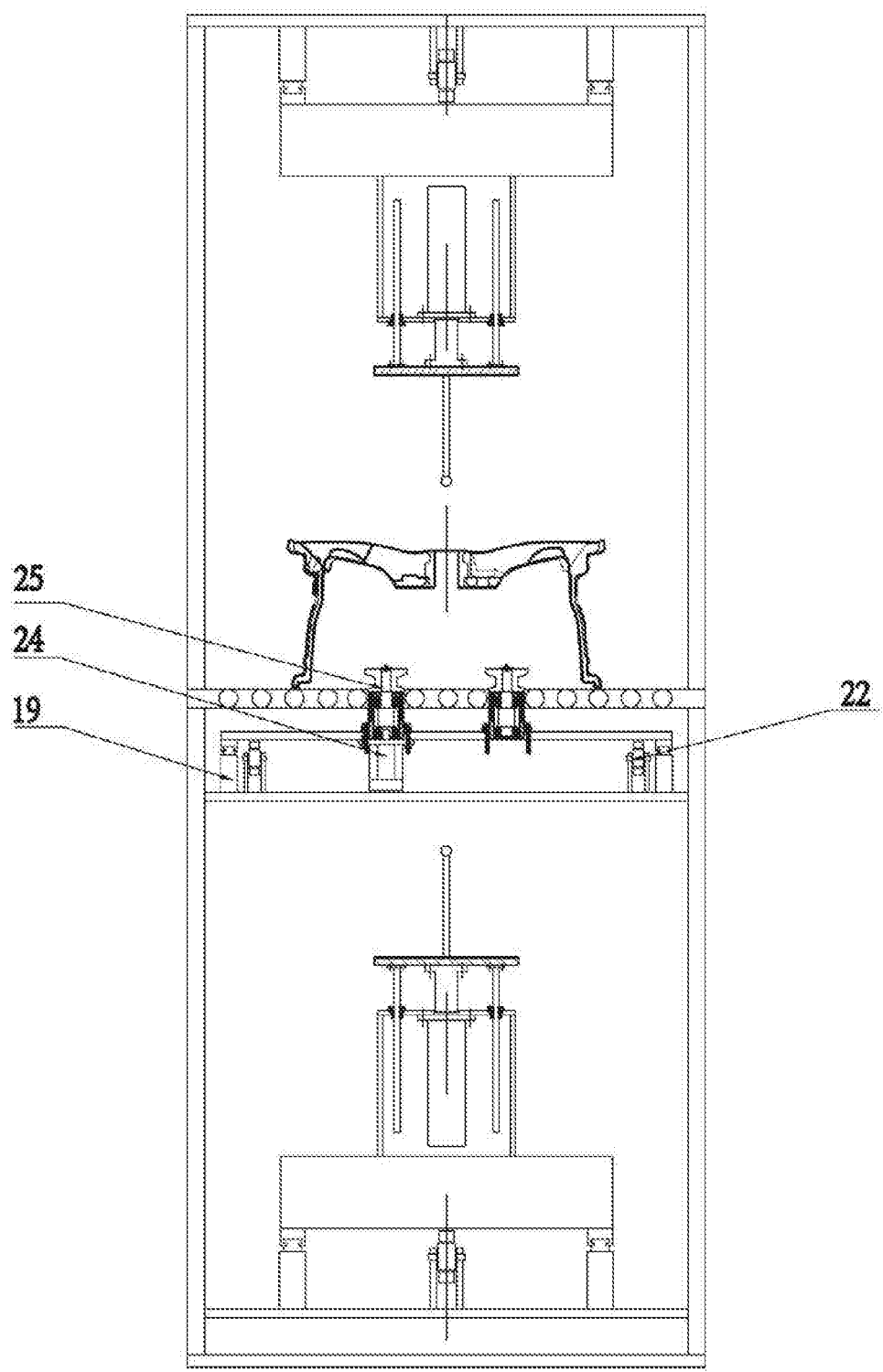
FIG. 2 is a left view of the wheel blank inspection device of the disclosure.
Figure 3:
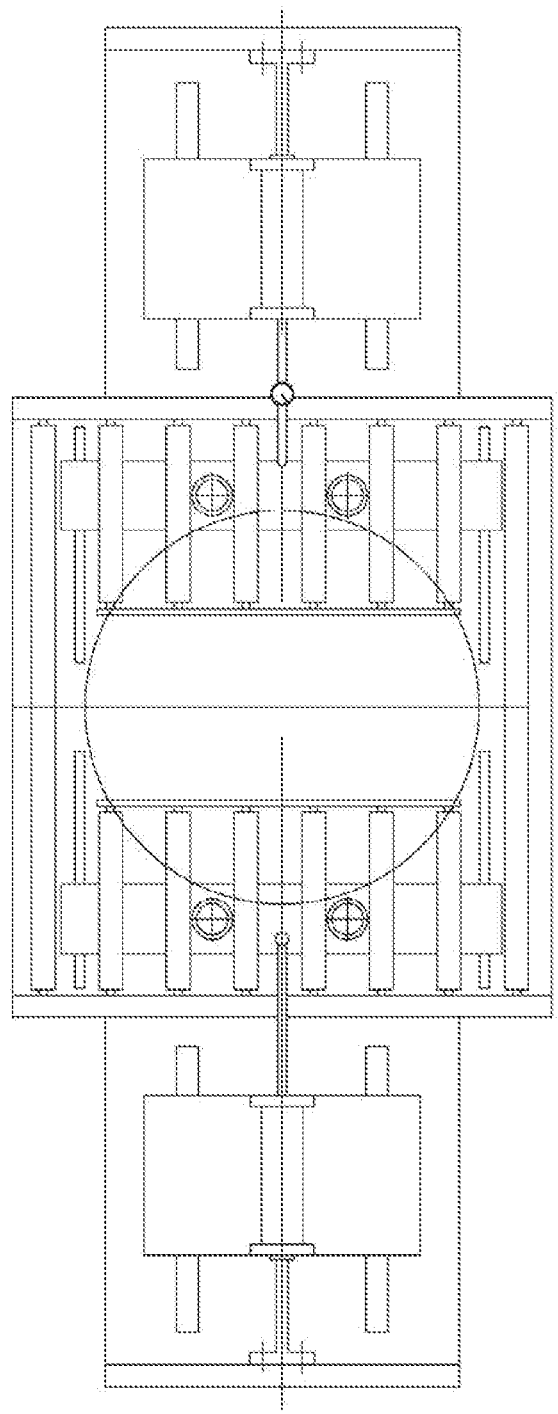
FIG. 3 is a top view of the wheel blank inspection device of the disclosure.
Figure 4:
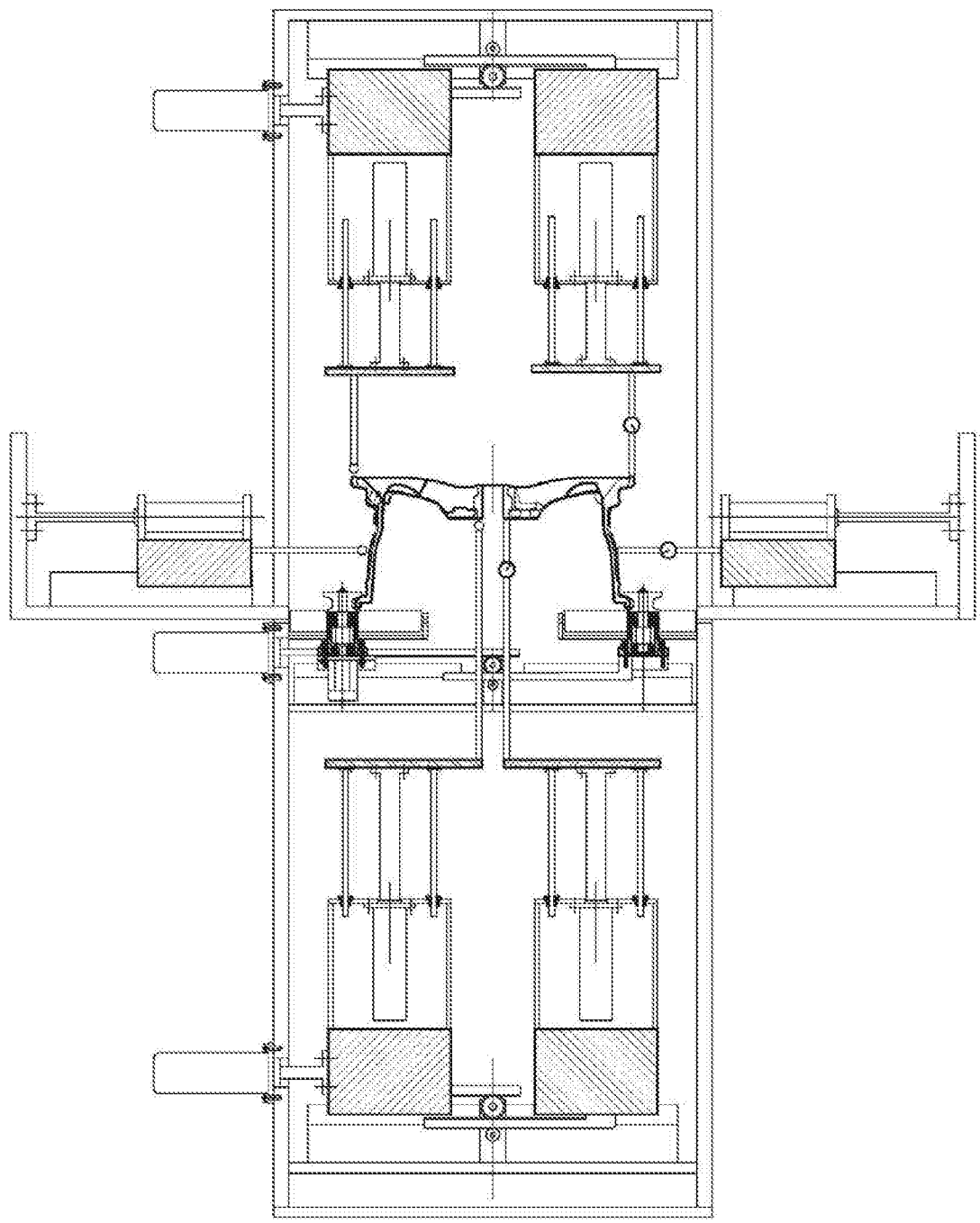
FIG. 4 is a schematic diagram of the wheel blank inspection device of the disclosure during inspection.

LIST OF REFERENCE SYMBOLS 1 rack
2 lower adjusting guide rail
3 lower adjusting cylinder
4 first left sliding table
5 first gear rack
6 first right sliding table
7 first left support frame
8 first servo electric cylinder
9 first left guide post
10 first left platform
11 first flange inspection rod
12 first piezoelectric sensor
13 first right support frame
14 second servo electric cylinder
15 first right guide post
16 first right platform
17 second flange inspection rod
18 first intelligent meter
19 guide rail
20 left sliding plate
21 right sliding plate
22 third gear rack
23 clamping cylinder
24 servo motor
25 clamping wheel
26 left guide rail
27 left sliding block
28 left electric cylinder
29 first rim inspection rod
30 second piezoelectric sensor
31 right guide rail
32 right sliding block
33 right electric cylinder
34 second rim inspection rod
35 second intelligent meter
36 upper adjusting guide rail
37 second left sliding table
38 second gear rack
39 second right sliding table 40 upper adjusting cylinder
41 second left support frame
42 third servo electric cylinder
43 second left guide post
44 second left platform
45 first end face inspection rod
46 third piezoelectric sensor
47 second right support frame
48 fourth servo electric cylinder
49 second right guide post
50 second right platform
51 second end face inspection rod
52 third intelligent meter

DETAILED DESCRIPTION

Details and working process of a specific device provided by the disclosure will be given below in combination with the accompanying drawings.

A wheel blank inspection device is composed of a rack 1, a lower adjusting guide rail 2, a lower adjusting cylinder 3, a first left sliding table 4, a first gear rack 5, a first right sliding table 6, a first left support frame 7, a first servo electric cylinder 8, first left guide posts 9, a first left platform 10, a first flange inspection rod 11, a first piezoelectric sensor 12, a first right support frame 13, a second servo electric cylinder 14, first right guide posts 15, a first right platform 16, a second flange inspection rod 17, a first intelligent meter 18, guide rails 19, a left sliding plate 20, a right sliding plate 21, third gear racks 22, a clamping cylinder 23, a servo motor 24, a clamping wheel 25, a left guide rail 26, a left sliding block 27, a left electric cylinder 28, a first rim inspection rod 29, a second piezoelectric sensor 30, a right guide rail 31, a right sliding block 32, a right electric cylinder 33, a second rim inspection rod 34, a second intelligent meter 35, an upper adjusting guide rail 36, a second left sliding table 37, a second gear rack 38, a second right sliding table 39, an upper adjusting cylinder 40, a second left support frame 41, a third servo electric cylinder 42, second left guide posts 43, a second left platform 44, a first end face inspection rod 45, a third piezoelectric sensor 46, a second right support frame 47, a fourth servo electric cylinder 48, second right guide posts 49, a second right platform 50, a second end face inspection rod 51 and a third intelligent meter 52.

The left sliding plate 20 and the right sliding plate 21 are symmetrically mounted on the guide rails 19 and connected via the third gear racks 22, the clamping cylinder 23 is fixed on the rack 1, and the output end of the clamping cylinder 23 is connected with the left sliding plate 20. The servo motor 24 is mounted on the left sliding plate 20, and the clamping wheel 25 is mounted at the output end of the motor; when the clamping cylinder 23 drives the left sliding plate 20 to move, the right sliding plate 21 moves synchronously under the structural action of the third gear racks 22, and a wheel can be positioned and clamped; and when the servo motor 24 drives the clamping wheel 25 to rotate, the wheel can rotate at a low speed under the action of friction.

The first left sliding table 4 and the first right sliding table 6 are symmetrically mounted on the lower adjusting guide rail 2 and connected via the first gear rack 5, the lower adjusting cylinder 3 is fixed on the rack 1, the output end of the lower adjusting cylinder 3 is connected with the first left sliding table 4, the first left support frame 7 is fixed on the first left sliding table 4, the first servo electric cylinder 8 is mounted on the first left support frame 7, the output end of the first servo electric cylinder 8 is connected with the first left platform 10, the first flange inspection rod 11 is fixed on the first left platform 10, and the first piezoelectric sensor 12 is mounted at the top of the first flange inspection rod 11. The first right support frame 13 is fixed on the first right sliding table 6, the second servo electric cylinder 14 is mounted on the first right support frame 13, the output end of the second servo electric cylinder 14 is connected with the first right platform 16, the second flange inspection rod 17 is fixed on the first right platform 16, and the first intelligent meter 18 is mounted on the second flange inspection rod 17. The lower adjusting cylinder 3 can adjust the distance between the first flange inspection rod 11 and the second flange inspection rod 17, and is used for inspecting wheels having different flange diameters. During inspection, the first servo electric cylinder 8 drives the first flange inspection rod 11 to ascend to the lower allowance of the rim depth, after the wheel rotates a circle, if the first piezoelectric sensor 12 does not pick up a signal, the rim depth of the wheel does not exceed the lower allowance, and if the first piezoelectric sensor 12 picks up a signal, the rim depth of the wheel exceeds the lower allowance; and the second servo electric cylinder 14 drives the second flange inspection rod 17 to ascend to the upper allowance of the rim depth, after the wheel rotates a circle, if the probe of the first intelligent meter 18 is compressed all the time, the rim depth does not exceed the upper allowance, and if the probe of the first intelligent meter 18 cannot be compressed all the time, the rim depth exceeds the upper allowance.

The left sliding block 27 is mounted on the left guide rail 26, the left electric cylinder 28 is fixed on the left sliding block 27, the output end of the left electric cylinder 28 is connected with the side rack, the first rim inspection rod 29 is mounted at the right end of the left sliding block 27, and the second piezoelectric sensor 30 is mounted at the top of the first rim inspection rod 29. The right sliding block 32 is mounted on the right guide rail 31, the right electric cylinder 33 is fixed on the right sliding block 32, the output end of the right electric cylinder 33 is connected with the side rack, the second rim inspection rod 34 is mounted at the left end of the right sliding block 32, and the second intelligent meter 35 is mounted on the second rim inspection rod 34. During inspection, the left electric cylinder 28 drives the first rim inspection rod 29 to move right to the upper allowance of the rim diameter, after the wheel rotates a circle, if the second piezoelectric sensor 30 does not pick up a signal, the rim diameter of the wheel does not exceed the upper allowance, and if the second piezoelectric sensor 30 picks up a signal, the rim diameter exceeds the upper allowance; and the right electric cylinder 33 drives the second rim inspection rod 34 to move left to the lower allowance of the rim diameter, after the wheel rotates a circle, if the probe of the second intelligent meter 35 is compressed all the time, the rim diameter does not exceed the lower allowance, and if the probe of the second intelligent meter 35 cannot be compressed all the time, the rim diameter exceeds the lower allowance.

The second left sliding table 37 and the second right sliding table 39 are symmetrically mounted on the upper adjusting guide rail 36 and connected via the second gear rack 38, the upper adjusting cylinder 40 is fixed on the rack 1, the output end of the upper adjusting cylinder 40 is connected with the second left sliding table 37, the second left support frame 41 is fixed on the second left sliding table 37, the third servo electric cylinder 42 is mounted on the second left support frame 41, the output end of the third servo electric cylinder 42 is connected with the second left platform 44, the first end face inspection rod 45 is fixed on the second left platform 44, and the third piezoelectric sensor 46 is mounted at the top of the first end face inspection rod 45. The second right support frame 47 is fixed on the second right sliding table 39, the fourth servo electric cylinder 48 is mounted on the second right support frame 47, the output end of the fourth servo electric cylinder 48 is connected with the second right platform 50, the second end face inspection rod 51 is fixed on the second right platform 50, and the third intelligent meter 52 is mounted on the second end face inspection rod 51. When the upper adjusting cylinder 40 is started, it can adjust the distance between the first end face inspection rod 45 and the second end face inspection rod 51, and is used for inspecting the end faces of wheels having different outer diameters. During inspection, the third servo electric cylinder 42 drives the first end face inspection rod 45 to descend to the upper allowance of the wheel height, after the wheel rotates one circle, if the third piezoelectric sensor 46 does not pick up a signal, the wheel height does not exceed the upper allowance, and if the third piezoelectric sensor 46 picks up a signal, the wheel height exceeds the upper allowance; and the fourth servo electric cylinder 48 drives the second end face inspection rod 51 to descend to the lower allowance of the wheel height, after the wheel rotates one circle, if the probe of the third intelligent meter 52 is compressed all the time, the wheel height does not exceed the lower allowance, and if the probe of the third intelligent meter 52 cannot be compressed all the time, the wheel height exceeds the lower allowance.

The working process of the wheel blank inspection device is: first, the distance between the first flange inspection rod 11 and the second flange inspection rod 17 is adjusted according to the flange diameter of a wheel produced on line, and the distance between the first end face inspection rod 45 and the second end face inspection rod 51 is adjusted according to the outer diameter of the wheel produced on line. After the wheel enters the device, the clamping cylinder 23 is started first to position and clamp the wheel; then the first servo electric cylinder 8, the second servo electric cylinder 14, the third servo electric cylinder 42, the fourth servo electric cylinder 48, the left electric cylinder 28 and the right electric cylinder 33 are started synchronously, the first servo electric cylinder 8 drives the first flange inspection rod 11 to ascend to the lower allowance of the rim depth, the second servo electric cylinder 14 drives the second flange inspection rod 17 to ascend to the upper allowance of the rim depth, the left electric cylinder 28 drives the first rim inspection rod 29 to move right to the upper allowance of the rim diameter, the right electric cylinder 33 drives the second rim inspection rod 34 to move left to the lower allowance of the rim diameter, the third servo electric cylinder 42 drives the first end face inspection rod 45 to descend to the upper allowance of the wheel height, and the fourth servo electric cylinder 48 drives the second end face inspection rod 51 to descend to the lower allowance of the wheel height; next, the servo motor 24 is started to drive the wheel to rotate a circle at a low speed, when the first piezoelectric sensor 12, the second piezoelectric sensor 30 and the third piezoelectric sensor 46 do not pick up signals and the probes of the first intelligent meter 18, the second intelligent meter 35 and the third intelligent meter 52 are in a compressed state all the time, the wheel blank is qualified, otherwise, the wheel blank is deformed greatly and unqualified. After inspection, the qualified blank enters a normal lower transfer roller bed, and the unqualified blank enters a reject roller bed.

The disclosure can inspect a cast blank deformed greatly to prevent it from entering a machining procedure, and the device is advanced in process, efficient, practical and easy to manufacture and can be used for 100% detection of cast blanks in automatic continuous production.

The invention claimed is:

1. A wheel blank inspection device, being composed of a rack, a lower adjusting guide rail, a lower adjusting cylinder, a first left sliding table, a first gear rack, a first right sliding table, a first left support frame, a first servo electric cylinder, first left guide posts, a first left platform, a first flange inspection rod, a first piezoelectric sensor, a first right support frame, a second servo electric cylinder, first right guide posts, a first right platform, a second flange inspection rod, a first intelligent meter, guide rails, a left sliding plate, a right sliding plate, third gear racks, a clamping cylinder, a servo motor, a clamping wheel, a left guide rail, a left sliding block, a left electric cylinder, a first rim inspection rod, a second piezoelectric sensor, a right guide rail, a right sliding block, a right electric cylinder, a second rim inspection rod, a second intelligent meter, an upper adjusting guide rail, a second left sliding table, a second gear rack, a second right sliding table, an upper adjusting cylinder, a second left support frame, a third servo electric cylinder, second left guide posts, a second left platform, a first end face inspection rod, a third piezoelectric sensor, a second right support frame, a fourth servo electric cylinder, second right guide posts, a second right platform, a second end face inspection rod and a third intelligent meter, wherein the left sliding plate and the right sliding plate are symmetrically mounted on the guide rails and connected via the third gear racks, the clamping cylinder being fixed on the rack, and the output end of the clamping cylinder being connected with the left sliding plate; the servo motor being mounted on the left sliding plate, and the clamping wheel being mounted at the output end of the motor; when the clamping cylinder drives the left sliding plate to move, the right sliding plate moving synchronously under the action of the third gear racks, and a wheel being able of being positioned and clamped; when the servo motor drives the clamping wheel to rotate, the wheel being able of rotating at a low speed under the action of friction;

the first left sliding table and the first right sliding table being symmetrically mounted on the lower adjusting guide rail and connected via the first gear rack, the lower adjusting cylinder being fixed on the rack, the output end of the lower adjusting cylinder being connected with the first left sliding table, the first left support frame being fixed on the first left sliding table, the first servo electric cylinder being mounted on the first left support frame, the output end of the first servo electric cylinder being connected with the first left platform, the first flange inspection rod being fixed on the first left platform, and the first piezoelectric sensor being mounted at the top of the first flange inspection rod; the first right support frame being fixed on the first right sliding table, the second servo electric cylinder being mounted on the first right support frame, the output end of the second servo electric cylinder being connected with the first right platform, and the second flange inspection rod being fixed on the first right platform; the first intelligent meter being mounted on the second flange inspection rod, and the lower adjusting cylinder being able of adjusting the distance between the first flange inspection rod and the second flange inspection rod;

the left sliding block being mounted on the left guide rail, the left electric cylinder being fixed on the left sliding block, the output end of the left electric cylinder being connected with the side rack, the first rim inspection rod being mounted at the right end of the left sliding block, and the second piezoelectric sensor being mounted at the top of the first rim inspection rod; the right sliding block being mounted on the right guide rail, the right electric cylinder being fixed on the right sliding block, the output end of the right electric cylinder being connected with the side rack, the second rim inspection rod being mounted at the left end of the right sliding block, and the second intelligent meter being mounted on the second rim inspection rod;

the second left sliding table and the second right sliding table being symmetrically mounted on the upper adjusting guide rail and connected via the second gear rack, the upper adjusting cylinder being fixed on the rack, the output end of the upper adjusting cylinder being connected with the second left sliding table, the second left support frame being fixed on the second left sliding table, the third servo electric cylinder being mounted on the second left support frame, the output end of the third servo electric cylinder being connected with the second left platform, the first end face inspection rod being fixed on the second left platform, and the third piezoelectric sensor is mounted at the top of the first end face inspection rod; the second right support frame being fixed on the second right sliding table, the fourth servo electric cylinder being mounted on the second right support frame, the output end of the fourth servo electric cylinder being connected with the second right platform, and the second end face inspection rod being fixed on the second right platform; the third intelligent meter being mounted on the second end face inspection rod, and when the upper adjusting cylinder is started, the distance between the first end face inspection rod and the second end face inspection rod being able of being adjusted.

* * * * *